United States Patent [19]
Hoffmann

[11] 3,777,170
[45] Dec. 4, 1973

[54] APPARATUS FOR PHOTOELECTRIC MONITORING

[75] Inventor: Peter Hoffmann, Frankfurt-Sindlingen, Germany

[73] Assignee: Olympia Werke AG, Wilhelmshaven, Germany

[22] Filed: Oct. 21, 1971

[21] Appl. No.: 191,547

[30] Foreign Application Priority Data
Oct. 21, 1970 Germany.................. P 20 51 667.0

[52] U.S. Cl...... 250/219 DC, 250/227, 250/219 DR
[51] Int. Cl............................................... G08c 9/06
[58] Field of Search................ 250/219 D, 219 DC, 250/227, 236, 216, 219 DR; 235/61.11 E

[56] References Cited
UNITED STATES PATENTS
3,512,130  5/1970  Hulett...................... 250/219 DC X
2,960,612  11/1960  Koulicovitch.................. 250/236 X
2,967,664  1/1961  Ress......................... 250/219 X DC
3,612,888  10/1971  Boucher............................ 250/227
3,274,392  9/1966  Harling............................. 250/227
3,086,123  4/1963  Marchal............................ 250/227

Primary Examiner—Walter Stolwein
Attorney—George H. Spencer et al.

[57] ABSTRACT

Apparatus for photoelectric scanning of perforated record members. The apparatus includes a light sensitive element and a light source. The light source projects a beam of light along a beam path toward the light sensitive element. A light deflecting member is provided for deflecting a portion of the beam of light from the beam path.

13 Claims, 3 Drawing Figures

APPARATUS FOR PHOTOELECTRIC MONITORING

BACKGROUND OF THE INVENTION

The present invention relates to an apparatus for the photoelectric scanning of perforated record members. The present invention more particularly relates to an apparatus for monitoring a photoelectric scanning station for perforated record members particularly punched cards and punched tapes.

For the photoelectric scanning of record members containing coded perforations it is well known to employ photodiodes or photocells and appropriate light sources of strip or dot shaped light beams. The arrangement is generally such that the light sources are disposed on one side of the perforated record member and the photodiodes or photocells are disposed on the other side of the record member, the record member moving along a set path.

The light-sensitive area of photodiodes and photocells is very sensitive to soiling of any type, particularly dust, and care is therefore usually taken to prevent soiling by dust or at least to reduce it. It is therefore well known to provide photodiode and photocell scanning stations for perforated record members with a dust cover.

Normally, with flat transporting means, the light sources are disposed below the moving record member and the photodiodes or photocells above the record member. The arrangement of a dust cover prevents or reduces the depositing of dust and the like on the light-sensitive areas of the photodiodes or photocells, but it also covers the scanning areas so that the operator is unable to determine readily and accurately whether the perforated record member has been properly inserted into the scanning station. Heavy deposits of dust or debris in the light channels may also darken the beam paths to such an extent that erroneous readings take place without the reason for these erroneous readings being discernible by the operator from the outside.

SUMMARY OF THE INVENTION

It is an object of the present invention to provide an apparatus for photoelectric scanning in which the light channels can be readily monitored by an operator.

It is another object of the present invention to provide an apparatus for photoelectric scanning in which the light paths may be readily monitored while concurrently protecting the light-sensitive elements from dust and the like.

It is a further object of the present invention to provide an apparatus for photoelectric scanning in which an operator can easily determine whether or not a record member is properly positioned for reading.

These and other objects of the present invention are accomplished by providing in an apparatus for photoelectric scanning of perforated record members at least one light-sensitive element and at least one light source. The light source projects a beam of light along a beam path toward the light-sensitive element. A light deflecting member is provided for deflecting a portion of the beam of light from the beam path.

An advantage of the apparatus of the present invention is particularly that it can be determined, by evaluation of the deflected light beam or beams, whether a record member is in the proper position in a reading station. A further advantage is that it is possible to check at any time, with the simplest technique, whether excess dirt deposits or debris in the area of the beam path or paths have excessively reduced the light permeability.

With an apparatus constructed in accordance with the present invention, which will be described in detail below in preferred embodiments thereof, it is possible to monitor dependably and comfortably operation of the photoelectric scanning station.

DESCRIPTION OF THE PREFERRED EMBODIMENTS

Figure 1:
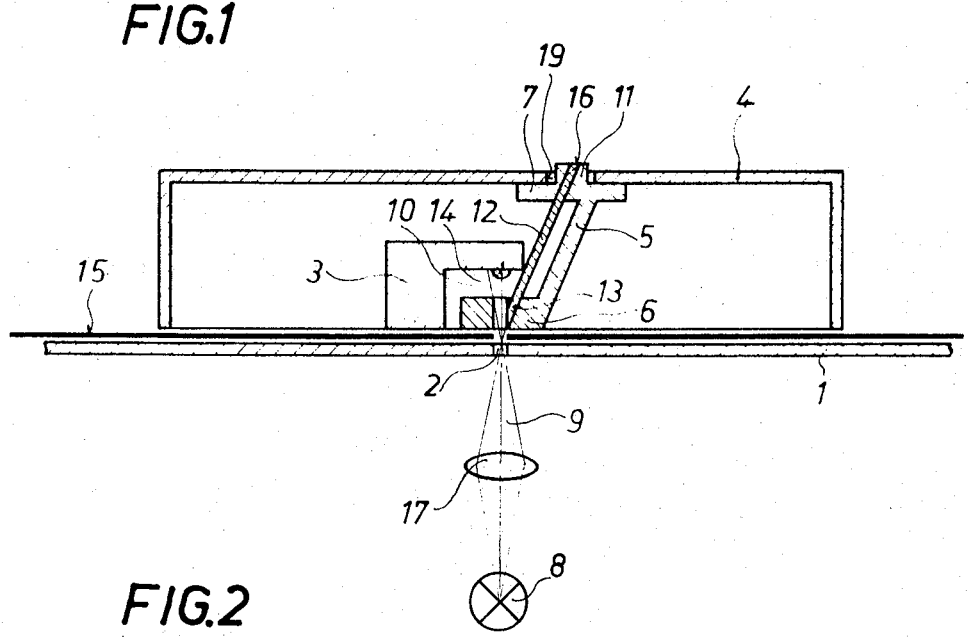
FIG. 1 is a longitudinal section of a first embodiment of an apparatus for photoelectric scanning in accordance with the present invention.
Figure 2:
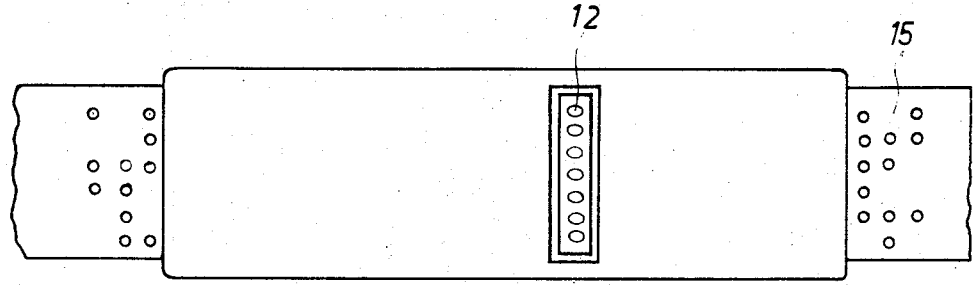
FIG. 2 is a plan view of the first embodiment shown in FIG. 1.

FIG. 1 shows in a longitudinal section, a light opaque record transporting member 1 positioned adjacent to a record member 15, a card or a tape. The transporting member 1 is provided with a plurality of openings 2 for light beams 9 from a light source 8. Instead of the plurality of openings 2, a common slit may be provided in the transporting member 1. Above the transporting member 1 an angled support 3 is held in such a manner that a passage is formed between the support 3 and the transporting member 1 for a record member 15 to be transported. This angled support 3 may be screwed at its ends to longitudinal walls of a hood 4. In the same manner as the angled support 3, a light indicator device is held above transporting member 1. The light indicator device consists of a light conductor carrier 5 whose lower angled end 6 is provided with a plurality of bores 10 or a common slit in the beam paths of the light source 8. An upper end 7 of the oblique angled light conductor carrier 5 has a T-shape and extends with a protrusion 11 into a cut-out portion 19 of an upper wall of the hood 4. A plurality of light conductors 12 are individually inserted into the bores 10 in the T-shaped end piece 7 and in the angled end piece 6 of the light conductor carrier 5 in parallel with the oblique portion of the light conductor carrier 5. The light conductors 12 may be of rod shape as best shown in FIG. 2. The light conductors 12 are made, for example, of synthetic glass. A suitable synthetic glass for this purpose, for example, is Plexiglas, manufactured by Rohm & Haas.

Each of the light conductors 12 is provided with a metal jacket or metal coating 13 only at the lower end, i.e. at the end into which the light comes. A separate light conductor 12, as best shown in FIG. 2, is associated with each scanning channel or each photodiode or photocell 14, respectively.

Figure 3:
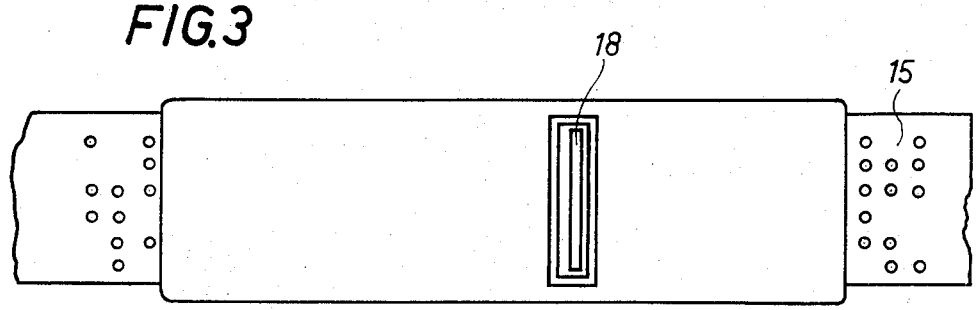
FIG. 3 is a plan view of a second embodiment of an apparatus for photoelectric scanning in accordance with the present invention.

Another possibility is, instead of the individual rod-shaped light conductors 12, to arrange a common light conductor 18 (FIG. 3) which extends over the width of the record member 15. The light beams passing through the code perforations of a record member 15 then appear on the light exit surface of the light conductor 18 (FIG. 3) in the shape of dots.

With the insertion of a record member 15 into the scanning station a perforated marking must lie below the photodiodes or photocells 14. The light sources 8 are switched on and their light beams pass through the record member to the photodiodes or photocells 14 at those points where code markings are present. At these points the light entry ends of the light conductors 12 or the light entry end of the light conductor 18 is also illuminated so that the correct position and the scanned code can be seen via the opening 19 in the hood 4 at the light exit ends 16, thus making it possible to independently determine if the record member is aligned. The beams from the light sources 8 here act not only on the light entry ends of the light conductors 12 or the light entry end of the light conductor 18 but also on their lateral surfaces so that the light flux in the light conductors or conductor is augmented.

The dependable operation of the device of the present invention is obtained with relatively low costs, the use of simple synthetic glass rods being particularly advantageous.

It will be understood that the above description of the present invention is susceptible to various modifications, changes and adaptations, and the same are intended to be comprehended within the meaning and range of equivalents of the appended claims.

I claim:

1. In a data processing system including apparatus for photoelectric scanning of perforated record members having at least one light-sensitive means, at least one light source means for projecting at least one beam of light along at least one beam path toward said at least one light-sensitive means and means for holding a record member in a position within the light beam path for enabling the information contained on the record member to be read, the improvement comprising means, arranged between a record member held by said holding means and said at least one light-sensitive means, for deflecting a portion of said at least one beam of light from said at least one beam path for allowing determination of the alignment of the record member by means which are independent of the first mentioned light-sensitive means.

2. The improved apparatus as defined in claim 1 wherein said at least one light-sensitive means comprises a plurality of light-sensitive means, said at least one light source means comprises light source means for projecting a plurality of beams of light along a plurality of beam paths toward said plurality of light-sensitive means, and said means for deflecting comprises means for deflecting a portion of each said plurality of beams of light from respective beam paths.

3. The improved apparatus as defined in claim 1 wherein said means for deflecting comprises at least one light conductor.

4. The improved apparatus as defined in claim 2 wherein said means for deflecting comprises a plurality of light conductors.

5. The improved apparatus as defined in claim 3 wherein said at least one light conductor is rod-shaped.

6. The improved apparatus as defined in claim 4 wherein each of said plurality of light conductors is rod-shaped, a separate rod-shaped light conductor being provided for each expected perforation channel in a record member.

7. The improved apparatus as defined in claim 2 wherein said means for deflecting a portion of each of said plurality of beams of light comprises a common light conductor operatively positioned to extend over all perforation channels in a record member.

8. The improved apparatus as defined in claim 3 wherein said at least one light conductor has an entry end and an exit end, and further comprising a metal jacket surrounding said at least one light conductor in the vicinity of said entry end.

9. The improved appratus as defined in claim 4 wherein said plurality of light conductors each have an entry end and an exit end, and further comprising a plurality of metal jackets each surrounding respectively separate ones of said plurality of light conductors in the vicinity of its respective entry end.

10. The improved apparatus as defined in claim 3 further comprising a light conductor support means and wherein said at least one light conductor includes an exit end and is arranged in said support means with said exit end readily visible.

11. The improved apparatus as defined in claim 4 further comprising a light conductor support means and wherein each of said plurality of light conductors has an exit end and all of said plurality of light conductors are arranged in said support means with said exit ends readily visible.

12. The improved apparatus as defined in claim 3 further comprising a hood having an upper side and a window in said upper side, and wherein said at least one light conductor has an exit end, said exit end being positioned near said window, said at least one light source means and said at least one light conductor being enclosed by said hood.

13. The improved apparatus as defined in claim 4 further comprising a hood having an upper side and a window in said upper side, and wherein each of said plurality of light conductors has an exit end, all said exit ends being positioned near said window, said at least one light source means and said plurality of light conductors being enclosed by said hood.

* * * * *